Nov. 25, 1924. 1,516,806
B. AMRIN
HOOK
Filed April 29, 1924
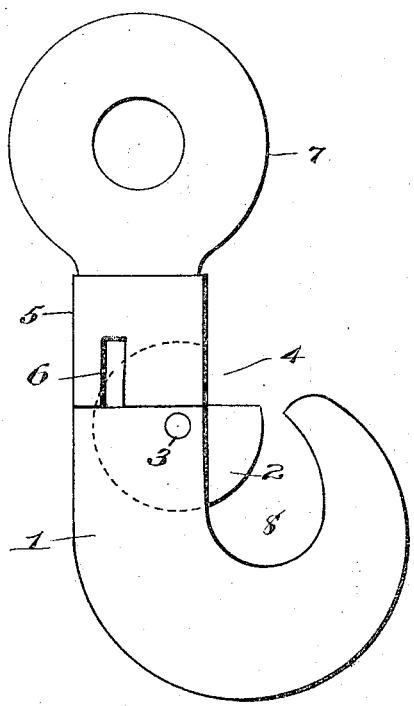
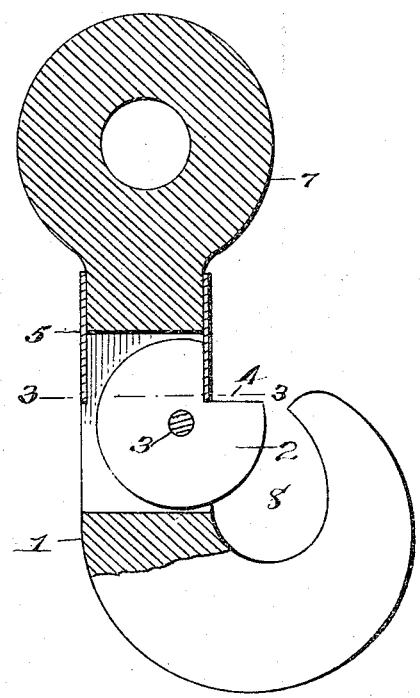
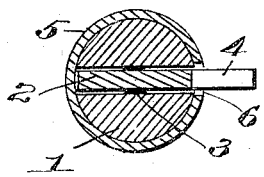
Inventor
Ben Amrin
By C. E. Richardson
Attorney Patented Nov. 25, 1924.

1,516,806

UNITED STATES PATENT OFFICE.

BEN AMRIN, OF BUCODA, WASHINGTON.

HOOK.

Application filed April 29, 1924. Serial No. 709,790.

*To all whom it may concern:*

Be it known that I, BEN AMRIN, a citizen of the United States, residing at Bucoda, in the county of Thurston and State of Washington, have invented certain new and useful Improvements in Hooks, of which the following is a specification.

This invention relates to hooks, and especially to that type which includes a safety-lock for retaining within the arm of said hook the cable, cord, rope, chain, eye, ring, etc., used in connection with said hook.

Its primary object is to provide a self-locking hook that is simple, accurate, substantial, practicable, economical and safe.

Another object is to provide a self-locking hook that will automatically retain in place the cable, chain or other object which it is designed to hold, without danger of said object being accidentally released.

A further object is to provide a self-locking hook, the closure of which is capable of being manually fixed in locked position and of being conveniently released, at the option of the user.

To these ends, I have invented a hook, in the shank of which is pivoted and from which there extends in the direction of the terminal of said hook, a vertically rotatable disk from which a segment has been cut from one edge; and, encircling said shank, a horizontally rotating collar provided with a slot through which the edges of said disk may be rotated; the said collar being capable of being turned so as to prevent the rotation of said disk.

In the drawings, Figure 1 is a side elevation of said hook; Figure 2 a sectional side view of the same; and Figure 3 a vertical section of said hook, on the lines 3—3 of Figure 2.

The numeral 1 represents the hooked terminal, 2 the disk, 3 the pivot upon which 2 rotates, 4 the segmental notch in said disk, 5 the rotatable collar, 6 the slot in said collar, 7 a ring terminal, and 8 the aperture formed by the curved arm of said hooked terminal 1.

In use, the hook is attached, by its ring 7 to the end of a rope, cable, chain, or other object, or attached in any desired manner to some convenient object such as a mast, derrick, crane, log, piling, etc., the disk 2 being in the position shown in the drawings—its cut-out segment exposed. The slot 6 in the collar 5 should, however, be directly over the cut-out portion of the disk 2, at that juncture, so that, when a cable or chain is laid across the projecting portion of the disk 2, the said disk may freely rotate upon its pivot 3, to give ingress to the space 8. This having been done, the disk 2 automatically returns to its normal position as shown in the drawings, thus preventing the escape of the cable or chain from its position on the hook. As a further measure of security, the collar 5 is given a slight turn, so that the slot 6 shall occupy a position similar to that shown in Figure 1, which prevents the disk from altering its position. Whenever it becomes necessary or desirable to release said cable or chain from the hook, the collar 5 is rotated to its former position with the slot 6 spanning the disk 2. This leaves the device in normal position and ready for repeated use as theretofore.

The disk 2, by reason of the cut-out segment having been removed from one edge, has a center of gravity opposite said cut-out; but this center of gravity is transferred to a point which compels the disk to gravitate to its normal position as shown in the drawings. This is done by either over-weighting it at the desired point, or by pivoting said disk slightly above the center of said disk.

The manual locking of said disk may be accomplished by other methods than by the preferred method shown, such as, for instance, the insertion of a pin through the shank and disk, the use of a slidable ring on said shank, or by other means.

It is also possible to substitute for the ring terminal 7 a second hook, or other supporting means. Other changes in the details and construction of said hook, and in the shape thereof, may be made, without departing from the spirit of my invention.

I claim:

1. In a self-locking hook, a shank with a hooked terminal, having, mortised and pivoted in said shank and extending slightly therefrom, a vertical disk a portion of which is cut away, and said disk so rotatable and weighted as to be capable of automatically closing the entrance to and exit from the space within the arm of said hooked terminal.

2. In a self-locking hook, a shank with a hooked terminal, having, mortised and pivoted in said shank and partly extending therefrom, a vertical disk partly cut away, said disk so rotatable and weighted as to be capable of automatically closing the exit from the space within the arm of said hooked terminal; and said shank provided with means capable of locking said disk in position when it is functioning as such closure.

In testimony whereof I have affixed my signature.

BEN AMRIN.